(12) United States Patent
Wei et al.

(10) Patent No.: US 12,608,100 B2
(45) Date of Patent: Apr. 21, 2026

(54) TOUCH DISPLAY PANEL AND TOUCH CONTROL DISPLAY APPARATUS

(71) Applicants: Wuhan Tianma Microelectronics Co., Ltd., Wuhan (CN); Wuhan Tianma Microelectronics Co., Ltd. Shanghai Branch, Shanghai (CN)

(72) Inventors: Qibing Wei, Wuhan (CN); Peng Zhang, Wuhan (CN); Xingyao Zhou, Wuhan (CN)

(73) Assignees: Wuhan Tiamma Microelectronics Co., Ltd., Wuhan (CN); Wuhan Tianma Microelectronics Co., Ltd. Shanghai Branch, Shanghai (CN)

( * ) Notice: Subject to any disclaimer, the term of this patent is extended or adjusted under 35 U.S.C. 154(b) by 0 days.

(21) Appl. No.: 18/736,536

(22) Filed: Jun. 7, 2024

(65) Prior Publication Data

US 2024/0329769 A1 Oct. 3, 2024

(30) Foreign Application Priority Data

Aug. 29, 2023 (CN) .......................... 202311113599.5

(51) Int. Cl.
G06F 3/041 (2006.01)

(52) U.S. Cl.
CPC ........ G06F 3/04164 (2019.05); G06F 3/0412 (2013.01)

(58) Field of Classification Search
None
See application file for complete search history.

(56) References Cited

U.S. PATENT DOCUMENTS 9,069,418 B2 * 6/2015 Grunthaner .............. H05K 3/24
10,156,924 B2 * 12/2018 Xie ....................... G06F 3/0412

FOREIGN PATENT DOCUMENTS

CN 105528115 B 1/2019
CN 115167698 A 10/2022

* cited by examiner

*Primary Examiner* — Brian M Butcher
(74) *Attorney, Agent, or Firm* — Wiersch Law Group

(57) ABSTRACT

A touch display panel and a touch control display apparatus, touch display panel includes: display region and first border region, first border region includes first outer edge; first touch electrodes are at least located in the display region; contact electrodes at least are located in first border region, the contact electrodes are respectively electrically connected to first touch electrodes. The first border region includes sub-regions in extension direction of first border region. Different numbers of contact electrodes are arranged in different sub-regions. The contact electrodes include at least one electrode sub-portion. The at least one electrode sub-portion of contact electrode is located in one of the sub-regions. The contact electrodes include edge contact electrode adjacent to first outer edge. In at least one of sub-regions, line width of electrode sub-portion of edge contact electrode is minimum value in line widths of all of electrode sub-portions in sub-region.

17 Claims, 19 Drawing Sheets

--Prior Art--

TOUCH DISPLAY PANEL AND TOUCH CONTROL DISPLAY APPARATUS

CROSS-REFERENCE TO RELATED APPLICATIONS

The present application claims priority to Chinese Patent Application No. 202311113599.5, filed on Aug. 29, 2023, the content of which is incorporated herein by reference in its entirety.

TECHNICAL FIELD

The present disclosure relates to the technical field of displays, and in particular to a touch display panel and a touch control display apparatus.

BACKGROUND

In an existing structure of a touch display panel, a touch electrode is connected to a pad through a contact electrode, so as to realize signal transmission between the touch electrode and a driver chip.

However, based on an existing design of the contact electrode, the touch display panel is vulnerable to damage by static electricity, and thus its reliability is affected.

SUMMARY

In view of this, embodiments of the present disclosure provide a touch display panel and a touch control display apparatus, to improve a reliability of the touch display panel.

According to an aspect, an embodiment of the present disclosure provides a touch display panel, including:

a display region and a first border region, the first border region including a first outer edge away from the display region;

first touch electrodes at least located in the display region; and contact electrodes at least located in the first border region, the contact electrodes being respectively electrically connected to the first touch electrodes.

The first border region includes sub-regions in an extension direction of the first border region. Different numbers of the contact electrodes are arranged in different sub-regions. The contact electrodes each include at least one electrode sub-portion. The at least one electrode sub-portion of the contact electrode is located in one of the sub-regions.

The contact electrodes include an edge contact electrode adjacent to the first outer edge. In at least one of the sub-regions, a line width of the electrode sub-portion of the edge contact electrode is a minimum value in line widths of all of the electrode sub-portions in the sub-region.

According to another aspect, an embodiment of the present disclosure provides a touch control display apparatus, including the foregoing touch display panel.

One of the foregoing technical solutions has the following beneficial effects:

In the embodiments of the present disclosure, in response to design of the edge contact electrode nearest to the first outer edge and most prone to accumulation of static electricity, a line width of the electrode sub-portion of the edge contact electrode is a minimum value in line widths of all of the electrode sub-portions in the sub-region. The electrode sub-portion of the edge contact electrode can be narrowed, and the line width of the electrode sub-portion increases the overall resistance of the edge contact electrode positively.

This can weaken a resistance difference between the edge contact electrode and the first touch electrode, and relieves a sudden change of the resistance at the connecting via hole between the edge contact electrode and the first touch electrode, thereby making the connecting via hole less risky to be damaged by the static electricity, and effectively improving the reliability of the display panel.

BRIEF DESCRIPTION OF DRAWINGS

To describe the technical solutions in the embodiments of the present disclosure more clearly, the following briefly describes the accompanying drawings required to be used in the embodiments. Apparently, the accompanying drawings in the following description show merely some embodiments of the present disclosure, and a person of ordinary skill in the art may still derive other accompanying drawings from these accompanying drawings without creative efforts.

DESCRIPTION OF EMBODIMENTS

For the sake of a better understanding of the technical solutions of the present disclosure, the embodiments of the present disclosure are described in detail below with reference to the accompanying drawings.

It should be noted that the embodiments in the following descriptions are merely some rather than all of the embodiments of the present disclosure. All other embodiments obtained by a person of ordinary skill in the art on the basis of the embodiments of the present disclosure without creative efforts shall fall within the protection scope of the present disclosure.

Terms used in the embodiments of the present disclosure are only for the purpose of describing specific embodiments, and are not intended to limit the present disclosure. Unless otherwise specified in the context, words, such as "a", "the", and "this", in a singular form in the embodiments of the present disclosure and the appended claims include plural forms.

It should be understood that the term "and/or" in this specification merely describes associations between associated objects, and it indicates three types of relationships. For example, A and/or B may indicate that A exists alone, A and B coexist, or B exists alone. In addition, the character "/" in this specification generally indicates that the associated objects are in an "or" relationship.

Before the technical solutions in the embodiments of the present disclosure are illustrated, a detailed description is made first to problems in the prior art.

Figure 1:
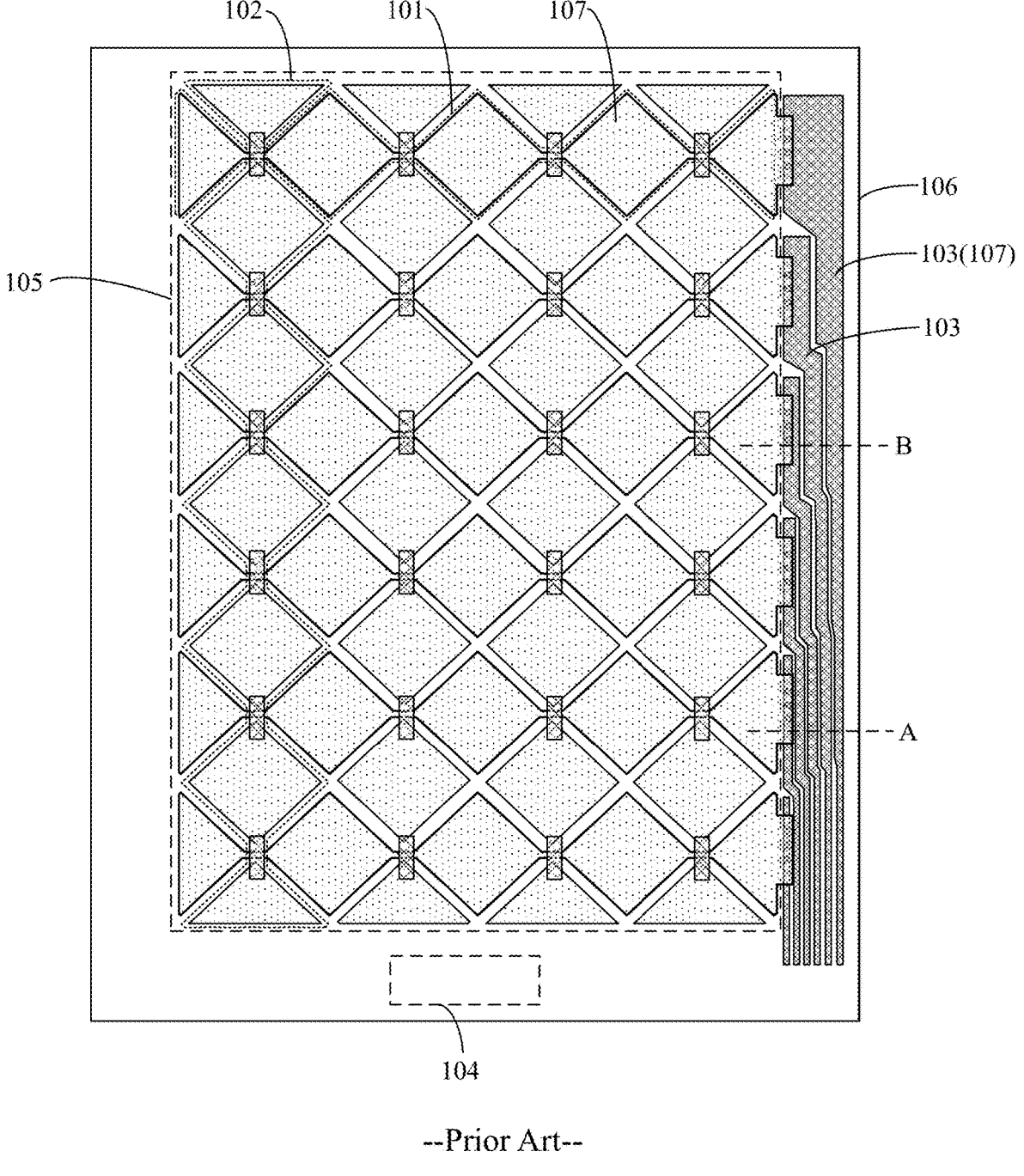
FIG. 1 is a schematic structural view of a touch display panel according to a prior art.

FIG. 1 is a schematic structural view of a touch display panel according to a prior art. As shown in FIG. 1, the touch display panel includes first touch electrodes 101 and second touch electrodes 102. The first touch electrodes 101 are respectively electrically connected to the contact electrodes 103.

As can be seen from the figure, the farther the distance away from a binding region 104, the fewer the contact electrodes 103 to be led out. Therefore, for the sake of reasonable space utilization of the single contact electrodes 103, when the contact electrodes 103 are designed, line widths of at least one of the contact electrodes 103 at different positions are increased gradually along a direction away from the binding region 104. For the touch electrodes at a same position, line widths of the contact electrodes 103 are also increased gradually or are the same along a direction from a display region 105 to a cutting line 106. For example, a line width of the single contact electrode 103 at a position B is greater than a line width of the single contact electrode at a position A. At the position A, the contact electrodes 103 have a same line width. At the position B, the contact electrodes 103 have a same line width. Based on this design, a line width of at least one of the contact electrodes 103 at a position away from the binding region 104 is at least three times a line width of the contact electrode at a position adjacent to the binding region 104.

However, evidences show that a resistance of the contact electrode 103 and a resistance of the touch electrode are significantly different under influences of such factors as materials and structures of the contact electrode 103 and the touch electrode. For example, the contact electrode 103 is mostly made of a metal material, while the touch electrode is mostly made of a light-transmitting material such as indium tin oxide. Since a resistivity of the light-transmitting material such as the indium tin oxide is far greater than a resistivity of the metal material, the resistance of the touch electrode is far greater than the resistance of the contact electrode 103. Or, even if the touch electrode is also made of a metal material, the touch electrode must be of a hollowed-out grid structure, so as to ensure normal light emission of the touch display panel in the display region 105. The grid structure also increases the resistance of the touch electrode, and thus the resistance of the touch electrode is still far greater than the resistance of the contact electrode 103. Concerning existing products, the resistance of the touch electrode is about 100 times the resistance of the contact electrode 103.

As such, there is a sudden change of the resistance at a connecting via hole between the contact electrode 103 and the first touch electrode 101. The connecting via hole is prone to damage by static electricity.

Moreover, the above problem is further exacerbated by the existing structure of the contact electrode 103. At present, the contact electrode 103 is widened, such that the resistance of the contact electrode is obviously reduced by a line width of the contact electrode 103. Thus, a greater resistance difference is caused at the connecting via hole between the contact electrode 103 and the first touch electrode 101. Along the direction away from the binding region 104, the line widths of the contact electrode 103 are increased gradually, and the resistance of the contact electrode 103 is reduced gradually from bottom to top. Consequently, the resistance of the contact electrode 103 at the connecting via hole is lower, and the sudden change for the resistance of the contact electrode 103 at the connecting via hole is greater. Particularly, in the contact electrodes 103, an outermost contact electrode 107 nearest to the cutting line 106 of the touch display panel is at greater risk of accumulating static electricity. The above design will further make the outermost contact electrode 107 more attacked by the static electricity, and thus the reliability of the touch display panel is lowered.

Figure 2:
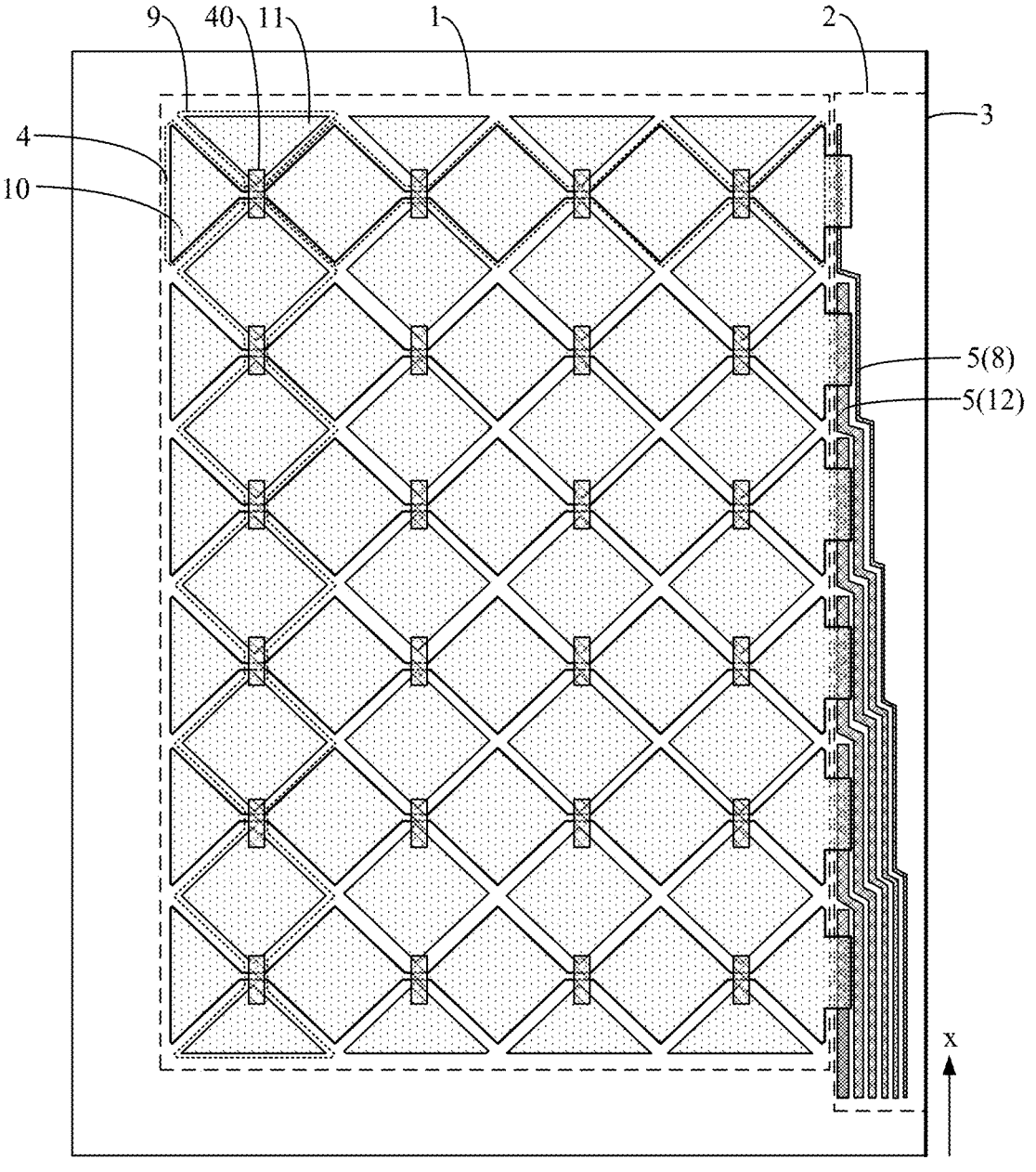
FIG. 2 is a schematic structural view of a touch display panel according to an embodiment of the present disclosure.
Figure 3:
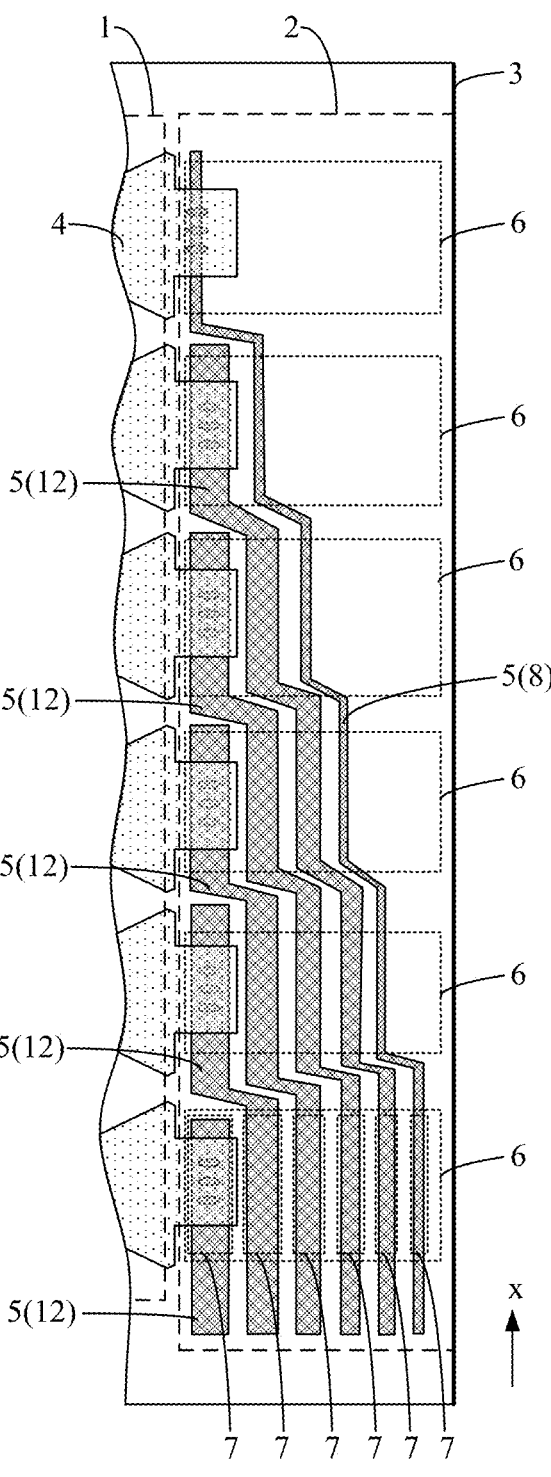
FIG. 3 is a partially enlarged schematic view corresponding to FIG. 2.

In view of the above problems, an embodiment of the present disclosure provides a touch display panel. FIG. 2 is a schematic structural view of a touch display panel according to an embodiment of the present disclosure. FIG. 3 is a partially enlarged schematic view corresponding to FIG. 2. As shown in FIG. 2 and FIG. 3, the touch display panel includes a display region 1 and a first border region 2. The first border region 2 includes a first outer edge 3 away from the display region 1. The first outer edge 3 serves as a cutting edge of the touch display panel. The display panel further includes first touch electrodes 4 and contact electrodes 5. The first touch electrodes 4 are at least located in the display region 1. The contact electrodes 5 are at least located in the first border region 2. The contact electrodes 5 are respectively electrically connected to the first touch electrodes 4. Specifically, the first touch electrode 4 may be connected to a pad in a binding region through the contact electrode 5, so as to realize signal transmission between the first touch electrode 4 and a driver chip.

Referring to FIG. 3, the first border region 2 includes sub-regions 6 in an extension direction of the first border region. Different numbers of the contact electrodes 5 are arranged in different sub-regions 6. The contact electrodes 5 each include at least one electrode sub-portion 7. The at least one electrode sub-portion 7 of the contact electrode 5 is located in one of the sub-regions 6.

The contact electrodes 5 include an edge contact electrode 8. The edge contact electrode 8 is adjacent to the first outer edge 3. That is, the edge contact electrode 8 is the outermost contact electrode 5 nearest to the first outer edge 3. In at least one of the sub-regions 6, a line width of the electrode sub-portion 7 of the edge contact electrode 8 is a minimum value in line widths of all of the electrode sub-portions 7 in the sub-region 6. For the expression "a line width of the electrode sub-portion 7 of the edge contact electrode 8 is a minimum value in line widths of all of the electrode sub-portions 7 in the sub-region 6", assuming that the electrode sub-portion 7 of the edge contact electrode 8 has the line width of d1, other electrode sub-portions 7 in the sub-region 6 of this electrode sub-portion 7 may have the line width of greater than d1. At least one of the other electrode sub-portions 7 may also have the line width of d1, and remaining other electrode sub-portions 7 have the line width of greater than d1. That is, in at least one of the sub-regions 6, at least two electrode sub-portions 7 may have the minimum line width, provided that the electrode sub-portions 7 with the minimum line width include the electrode sub-portion 7 of the edge contact electrode 8.

More specifically, in an implementation, referring to FIG. 2, the display panel further includes second touch electrodes 9. An arrangement direction for the first touch electrodes 4 intersects with an arrangement direction for the second touch electrodes 9. The first touch electrode 4 each include a plurality of first electrode members 10 communicating with each other. An arrangement direction for the plurality of first electrode members 10 is parallel to the arrangement direction for the second touch electrodes 9. The second touch electrodes 9 each include a plurality of second electrode members 11. An arrangement direction for the plurality of second electrode members 11 is parallel to the arrangement direction for the first touch electrodes 4. Adjacent ones of the second electrode members 11 are electrically connected through a cross-bridge 40.

In the embodiment of the present disclosure, in response to design of the edge contact electrode 8 nearest to the first outer edge 3 and most prone to accumulation of static electricity, a line width of the electrode sub-portion 7 of the edge contact electrode 8 is a minimum value in line widths of all of the electrode sub-portions 7 in the sub-region 6. The electrode sub-portion 7 of the edge contact electrode 8 can be narrowed, and the line width of the electrode sub-portion 7 increases the overall resistance of the edge contact electrode 8 positively. This can weaken a resistance difference between the edge contact electrode 8 and the first touch electrode 4, and relieves a sudden change of the resistance at the connecting via hole between the edge contact electrode 8 and the first touch electrode 4, thereby making the connecting via hole less risky to be damaged by the static electricity, and effectively improving the reliability of the display panel.

In a possible implementation, in at least one of the sub-regions 6, the line width of the electrode sub-portion 7 of the edge contact electrode 8 is greater than or equal to 3.7 µm and smaller than or equal to 10 µm.

Further, the line width of the electrode sub-portion 7 of the edge contact electrode 8 is greater than or equal to 3.7 µm and smaller than or equal to 5 µm. Still further, the line width of the electrode sub-portion 7 of the edge contact electrode 8 may be 3.7 µm.

In the embodiment of the present disclosure, in view of the existing process capability, the line width of the electrode sub-portion 7 of the edge contact electrode 8 may be 3.7 µm minimally. In order to ensure that the electrode sub-portion 7 of the edge contact electrode 8 is narrow enough, and its line width can obviously increase the overall resistance of the edge contact electrode 8, the line width of the electrode sub-portion 7 of the edge contact electrode 8 may further be 10 µm maximally.

It is to be noted that the expression "the line width of the electrode sub-portion 7 of the edge contact electrode 8 is greater than or equal to 3.7 µm and smaller than or equal to 10 µm" refers to that the line width of each electrode sub-portion 7 of the edge contact electrode 8 is greater than or equal to 3.7 µm and smaller than or equal to 10 µm. The electrode sub-portions 7 in the edge contact electrode 8 may have a same line width, and may also have different line widths.

In a possible implementation, referring also to FIG. 3, the contact electrodes 5 further include intermediate contact electrodes 12. The intermediate contact electrodes 12 are located between the display region 1 and the edge contact electrode 8. In at least one of the sub-regions 6, the electrode sub-portions 7 of at least two of the intermediate contact electrodes 12 have a same line width. And/or, in at least one of the sub-regions 6, the electrode sub-portions 7 of at least two of the intermediate contact electrodes 12 have different line widths.

In the contact electrodes 5, the anti-static electricity capacity of the outermost edge contact electrode 8 has a greater influence on the touch display panel. In the embodiment of the present disclosure, the edge contact electrode 8 has the narrowest electrode sub-portion 7. While the anti-static electricity capacity of the edge contact electrode 8 is effectively improved, the line widths of the intermediate contact electrodes 12 can be designed more flexibly. For example, when the intermediate contact electrodes 12 are arranged in the sub-region 6, the electrode sub-portions 7 of two, three or all of the intermediate contact electrodes 12 may have a same line width, or the electrode sub-portions 7 of any two of the intermediate contact electrodes 12 may have different line widths. In this way, the line widths of the intermediate contact electrodes 12 may be designed more freely, and problems such as uniform distribution of electrode patterns in different sub-regions 6 can be effectively improved with the intermediate contact electrodes 12.

Figure 4:
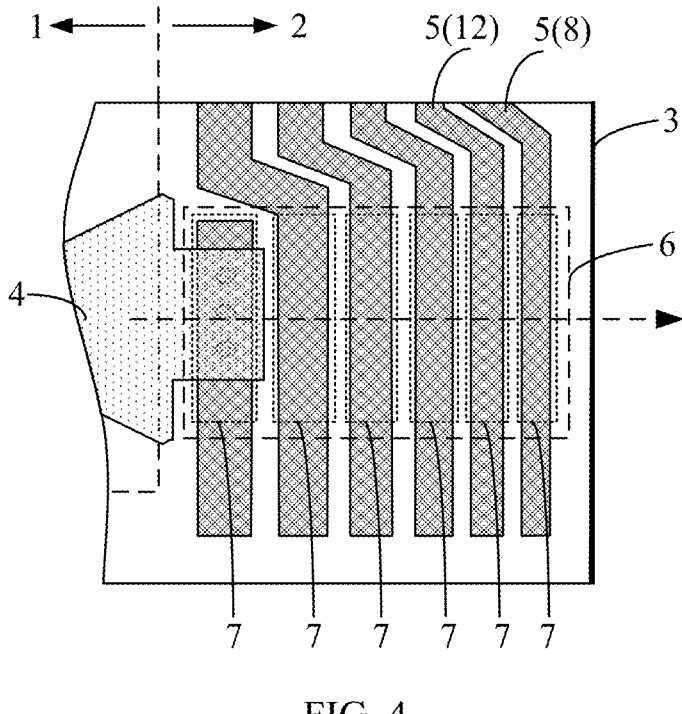
FIG. 4 is a schematic structural view of an electrode sub-portion in a sub-region according to an embodiment of the present disclosure.

FIG. 4 is a schematic structural view of an electrode sub-portion 7 in a sub-region 6 according to an embodiment of the present disclosure. In a possible implementation, as shown in FIG. 4, for at least one of the sub-regions 6, along a direction from the display region 1 to the first outer edge 3 (as shown by a dotted arrow in FIG. 4), line widths of the electrode sub-portions 7 in the sub-region 6 are decreased gradually.

In an implementation, with six electrode sub-portions 7 in the sub-region 6 in the figure as an example, line widths of the six electrode sub-portions 7 can be 10 µm, 9 µm, 8 µm, 7 µm, 6 µm and 5 µm respectively along the direction from the display region 1 to the first outer edge 3.

In the above implementation, the line widths of the electrode sub-portions 7 in the sub-region 6 are decreased gradually along the direction from the display region 1 to the first outer edge 3. In this way, the electrode sub-portion 7 closer to the first outer edge 3 has the smaller line width. For the contact electrode 5 closer to the first outer edge 3, line widths of the electrode sub-portions 7 are more beneficial to increase the overall resistance of the contact electrode, and the sudden change of the resistance at the connecting via hole between the outer contact electrode 5 and the first touch electrode 4 is further relieved, thereby effectively improving an anti-static electricity capacity of the outer contact electrode 5.

Figure 5:
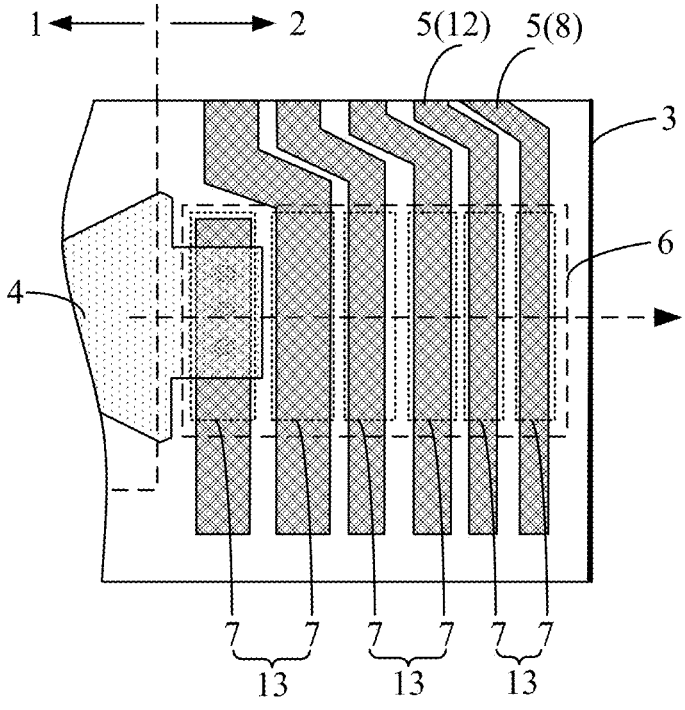
FIG. 5 is another schematic structural view of an electrode sub-portion in a sub-region according to an embodiment of the present disclosure.

FIG. 5 is another schematic structural view of an electrode sub-portion 7 in a sub-region 6 according to an embodiment of the present disclosure. In a possible implementation, as shown in FIG. 5, for at least one of the sub-regions 6, the electrode sub-portions 7 in the sub-region 6 are formed into at least two electrode sets 13. The electrode sub-portions 7 in a same one of the electrode sets 13 have a same line width. Along a direction from the display region 1 to the first outer edge 3 (as shown by a dotted arrow in FIG. 5), line widths of the electrode sub-portions 7 in the at least two electrode sets 13 are decreased gradually.

It is to be noted that in the embodiment of the present disclosure, numbers of the electrode sub-portions 7 in different electrode sets 13 in the sub-region 6 may be the same and may also be different. When the sub-region 6 includes three or more electrode sets 13, differences between line widths of the electrode sub-portions 7 in two adjacent ones of the electrode sets 13 may be the same, and may also be different.

In an implementation, with six electrode sub-portions 7 in the sub-region 6 in the figure as an example, the six electrode sub-portions 7 in the sub-region 6 are formed into three electrode sets 13. Each electrode set 13 includes two electrode sub-portions 7. Line widths of the six electrode sub-portions 7 can be 10 μm, 10 μm, 8 μm, 8 μm, 5 μm and 5 μm respectively along the direction from the display region 1 to the first outer edge 3.

In the above implementation, the line widths of the electrode sub-portions 7 in the sub-region 6 are grouped and decreased gradually along the direction from the display region 1 to the first outer edge 3. In this way, the line width of the contact electrode 5 closer to the first outer edge 3 is more beneficial to increase the overall resistance of the contact electrode, thereby effectively improving an anti-static electricity capacity of the outer contact electrode 5. Moreover, in case of a greater number of the contact electrodes 5, for the sub-region 6 where many electrode sub-portions 7 are arranged, the line widths of the electrode sub-portions 7 in the sub-region 6 can be grouped and decreased gradually to make the design simpler.

Figure 6:
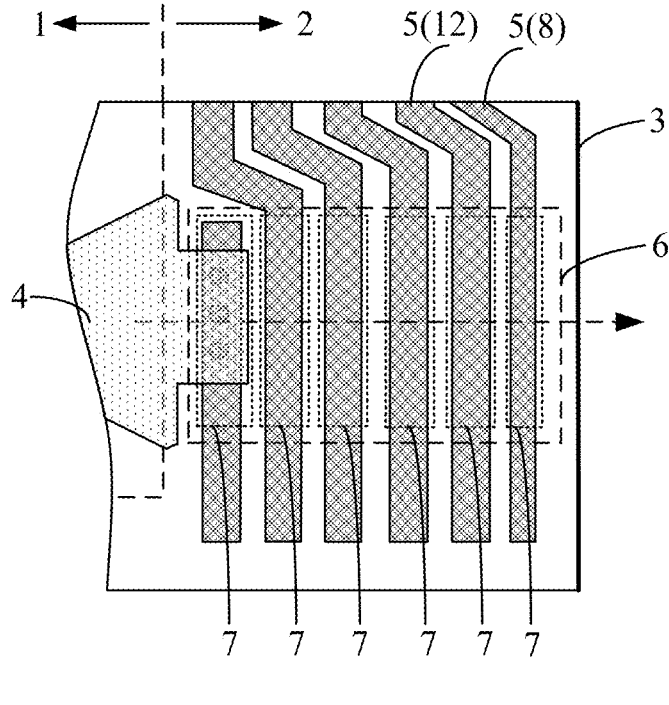
FIG. 6 is still another schematic structural view of an electrode sub-portion in a sub-region according to an embodiment of the present disclosure.

FIG. 6 is still another schematic structural view of an electrode sub-portion 7 in a sub-region 6 according to an embodiment of the present disclosure. In a possible implementation, as shown in FIG. 6, the contact electrodes 5 further include intermediate contact electrodes 12. The intermediate contact electrodes 12 are located between the display region 1 and the edge contact electrode 8. For at least one of the sub-regions 6, the electrode sub-portions 7 of at least two of the intermediate contact electrodes 12 in the sub-region 6 have a same line width.

In an implementation, with six contact electrodes 5 in the sub-region 6 in the figure as an example, line widths of the six electrode sub-portions 7 in the sub-region 6 can be 8 μm, 8 μm, 8 μm, 8 μm, 8 μm and 5 μm respectively along a direction from the display region 1 to the first outer edge 3.

In the above implementation, the electrode sub-portions 7 of the inner contact electrodes 5 in the sub-region 6 have a same line width. This can further simplify the line widths of the contact electrodes 5, lowers a design difficulty, and has lower requirements on a process accuracy of the contact electrodes 5.

It is to be noted that in the embodiment of the present disclosure, in the plurality of sub-regions 6, for the sub-region 6 with the electrode sub-portions 7, the line widths of the electrode sub-portions 7 in the sub-region 6 may be decreased gradually as shown in FIG. 4, or may be grouped and decreased gradually as shown in FIG. 5. Or, the line widths of the electrode sub-portions 7 of the intermediate contact electrodes 12 may be the same as shown in FIG. 6. Or, the line widths of the electrode sub-portions in at least one of the sub-regions 6 may be decreased gradually as shown in FIG. 4, the line widths of the electrode sub-portions in at least one of the sub-regions 6 may be grouped and decreased gradually as shown in FIG. 5, and the line widths of the electrode sub-portions 7 of the intermediate contact electrodes 12 in at least one of the sub-regions 6 may be the same as shown in FIG. 6.

It is further to be noted that three of the above designs for line widths of the electrode sub-portions 7 in the sub-region 6 are only intended for the single sub-region 6. No matter what line widths are used by the electrode sub-portions 7 in different sub-regions 6, line widths of the electrode sub-portions 7 of the same contact electrode 5 in the plurality of sub-regions 6 may be the same, and may also be different.

Figure 7:
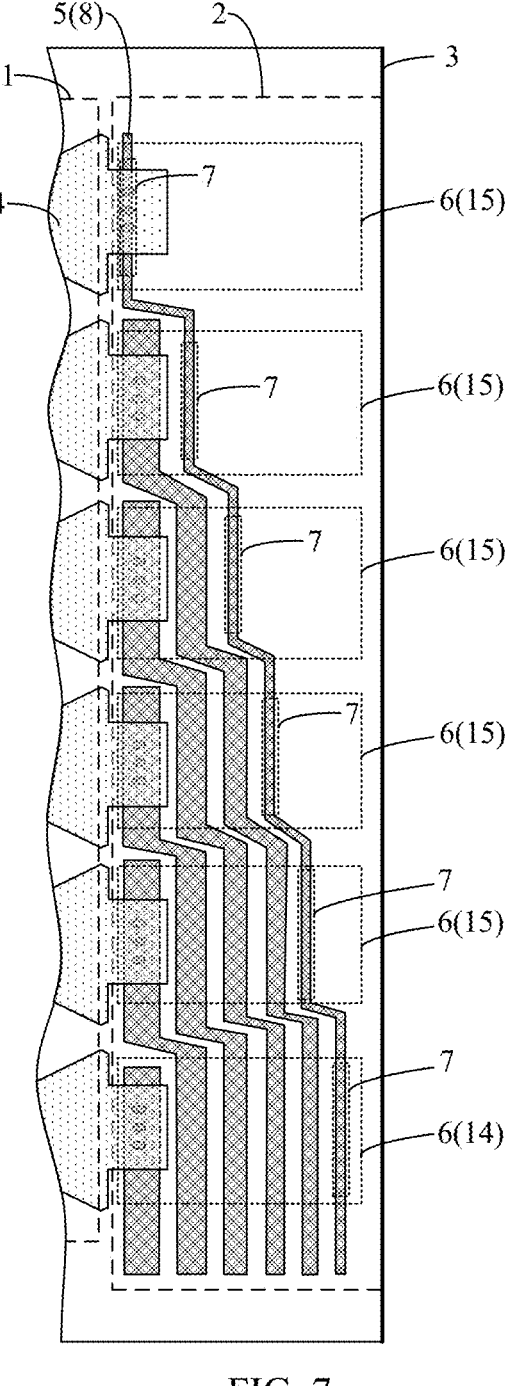
FIG. 7 is a schematic structural view of a contact electrode according to an embodiment of the present disclosure.

FIG. 7 is a schematic structural view of a contact electrode 5 according to an embodiment of the present disclosure. In a possible implementation, as shown in FIG. 7, the sub-regions 6 include a first sub-region 14 and at least one second sub-region 15. A number of the electrode sub-portions 7 in the first sub-region 14 is greater than a number of the electrode sub-portions 7 in the second sub-region 15. Exemplarily, the first sub-region 14 may be the sub-region 6 with a largest number of the electrode sub-portions 7, while the second sub-region 15 may be the other sub-region 6 except the first sub-region 14.

A line width of the electrode sub-portion 7 of the edge contact electrode 8 in the second sub-region 15 is the same as a line width of the electrode sub-portion 7 of the edge contact electrode in the first sub-region 14.

With reference to associated description on the existing contact electrode 5 in FIG. 1, if the line width design method in the prior art is used by the contact electrode 5, the line width of the electrode sub-portion 7 of the edge contact electrode 8 in the second sub-region 15 is greater than the line width of the electrode sub-portion 7 of the edge contact electrode in the first sub-region 14. In the embodiment of the present disclosure, the line width of the electrode sub-portion 7 of the edge contact electrode 8 in the second sub-region 15 is the same as the line width of the electrode sub-portion 7 of the edge contact electrode in the first sub-region 14. That is, the electrode sub-portion 7 of the edge contact electrode 8 in the second sub-region 15 is not widened in the embodiment of the present disclosure. By keeping the edge contact electrode 8 relatively narrow at more positions, the overall resistance of the edge contact electrode 8 is increased to a greater extent, and the anti-static electricity capacity of the edge contact electrode is improved more effectively.

Further, referring also to FIG. 7, in the plurality of sub-regions 6, a largest number of the electrode sub-portions 7 are arranged in the first sub-region 14.

With reference to associated description on the existing contact electrode 5 in FIG. 1, if the design method in the prior art is used by the contact electrode 5, when the largest number of the electrode sub-portions 7 are arranged in the first sub-region 14, the electrode sub-portion 7 of the contact electrode 5 in the first sub-region 14 is narrowest. In the embodiment of the present disclosure, the line width of the electrode sub-portion 7 of the edge contact electrode 8 in the second sub-region 15 is the same as the line width of the narrowest electrode sub-portion 7 of the edge contact electrode in the first sub-region 14. The electrode sub-portion 7 of the edge contact electrode 8 in the second sub-region 15 is also narrowest, thereby further increasing the resistance of the edge contact electrode 8.

Further, the electrode sub-portions 7 of the edge contact electrode 8 have a same line width, such as 3.7 μm.

Figure 8:
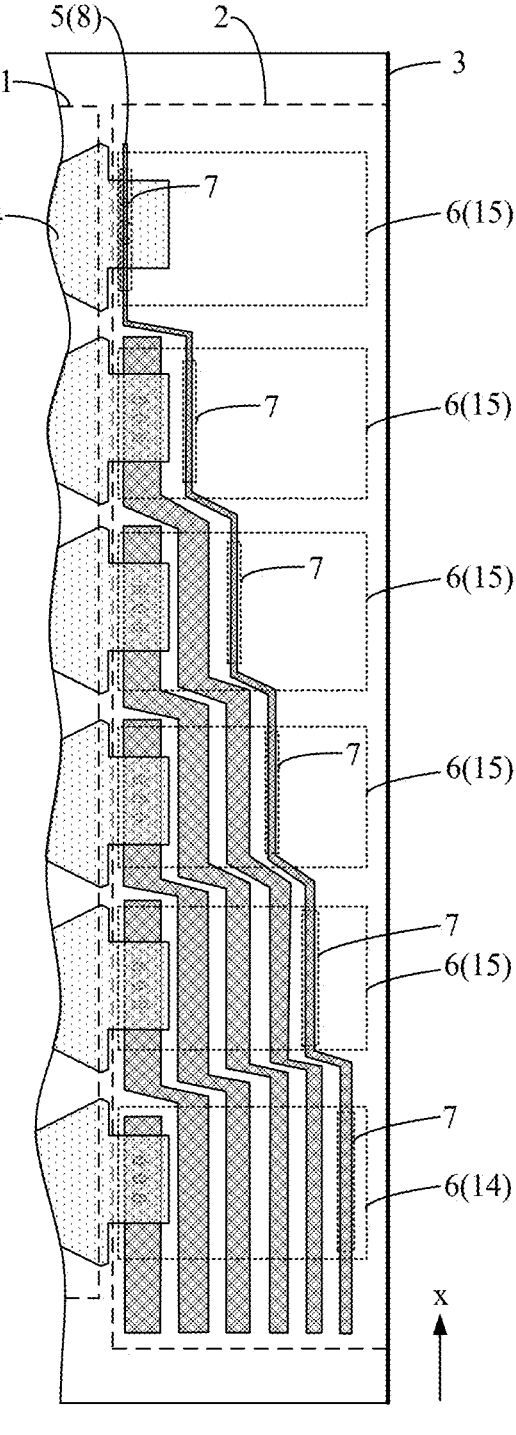
FIG. 8 is another schematic structural view of a contact electrode according to an embodiment of the present disclosure.

FIG. 8 is another schematic structural view of a contact electrode 5 according to an embodiment of the present disclosure. In a possible implementation, as shown in FIG. 8, the sub-regions 6 include a first sub-region 14 and at least one second sub-region 15. A number of the electrode sub-portions 7 in the first sub-region 14 is greater than a number of the electrode sub-portions 7 in the second sub-region 15. Exemplarily, the first sub-region 14 may be the sub-region 6 with a largest number of the electrode sub-portions 7, while the second sub-region 15 may be the other sub-region 6 except the first sub-region 14.

A line width of the electrode sub-portion 7 of the edge contact electrode 8 in the second sub-region 15 is smaller than a line width of the electrode sub-portion 7 of the edge contact electrode in the first sub-region 14.

With reference to associated description on the existing contact electrode 5 in FIG. 1, if the line width design method in the prior art is used by the contact electrode 5, the line width of the electrode sub-portion 7 of the edge contact electrode 8 in the second sub-region 15 is greater than the line width of the electrode sub-portion 7 of the edge contact electrode in the first sub-region 14. In the embodiment of the present disclosure, the line width of the electrode sub-portion 7 of the edge contact electrode 8 in the second sub-region 15 is smaller than the line width of the electrode sub-portion 7 of the edge contact electrode in the first sub-region 14. That is, the electrode sub-portion 7 of the edge contact electrode 8 in the second sub-region 15 is not widened, but further narrowed in the embodiment of the present disclosure. By further reducing the overall line width of the edge contact electrode 8, the overall resistance of the edge contact electrode 8 is increased to a greater extent, and the anti-static electricity capacity of the edge contact electrode is improved more effectively.

Further, referring also to FIG. 8, along a first direction x, numbers of the electrode sub-portions 7 in the plurality of sub-regions 6 are decreased gradually. Along the first direction x, line widths of the electrode sub-portions 7 of the edge contact electrode 8 are decreased gradually.

With such a structure, along the first direction x, the resistance of the edge contact electrode 8 is gradually increased. The edge contact electrode 8 closer to a connecting position with the first touch electrode 4 has a larger local resistance. This further relieves the sudden change of the resistance at the connecting via hole between the edge contact electrode 8 and the first touch electrode 4.

Figure 9:
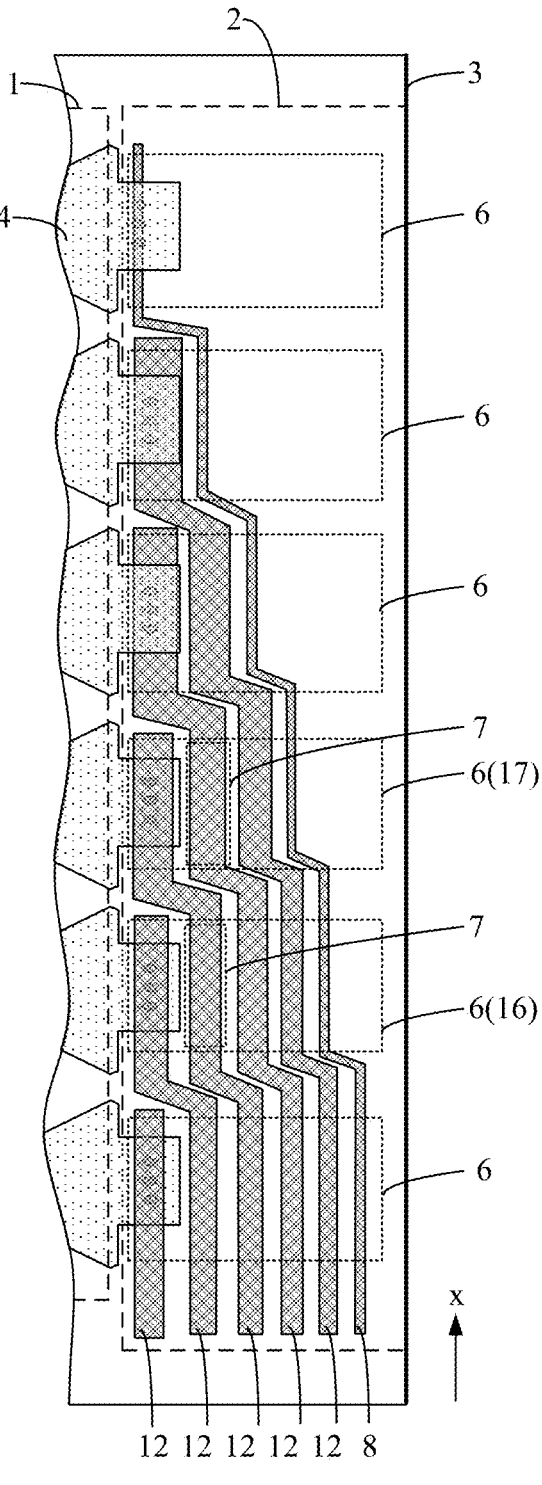
FIG. 9 is still another schematic structural view of a contact electrode according to an embodiment of the present disclosure.

FIG. 9 is still another schematic structural view of a contact electrode 5 according to an embodiment of the present disclosure. In a possible implementation, as shown in FIG. 9, along a first direction x, numbers of the electrode sub-portions 7 in the plurality of sub-regions 6 are decreased gradually. The contact electrodes 5 further include intermediate contact electrodes 12. The intermediate contact electrodes 12 are located between the display region 1 and the edge contact electrode 8. Along the first direction x, line widths of the electrode sub-portions 7 of at least one of the intermediate contact electrodes 12 are increased gradually.

Along the first direction x, for fewer contact electrodes 5 led out in the plurality of sub-regions 6, numbers of the electrode sub-portions 7 to be arranged in the plurality of sub-regions 6 are increasingly small. In view of this, when line widths of the electrode sub-portions 7 of the intermediate contact electrode 12 are designed, the line widths of the electrode sub-portions 7 are increased gradually along the first direction x. From bottom to top, the electrode sub-portions 7 of the intermediate contact electrode 12 become wider. This can improve uniform distribution of electrode patterns in different sub-regions 6, and make etching and reflection more uniform.

Further, referring also to FIG. 9, two adjacent ones of the sub-regions 6 include a third sub-region 16 and a fourth sub-region 17. A number of the electrode sub-portions 7 in the third sub-region 16 is greater than a number of the electrode sub-portions 7 in the fourth sub-region 17. For two adjacent ones of the intermediate contact electrodes 12, a line width of the electrode sub-portion 7 of the intermediate contact electrode 12 adjacent to the first outer edge 3 in the fourth sub-region 17 is greater than a line width of the electrode sub-portion 7 of the intermediate contact electrode 12 away from the first outer edge 3 in the third sub-region 16.

Figure 10:
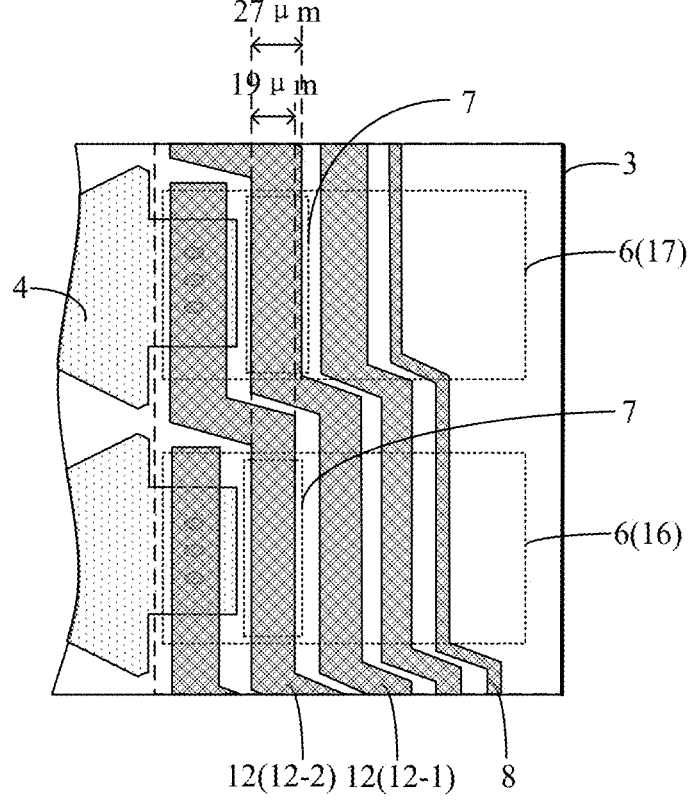
FIG. 10 is a partially enlarged schematic view of FIG. 9.

FIG. 10 is a partially enlarged schematic view of FIG. 9. For clearer illustration, as shown in FIG. 10, with two adjacent sub-regions 6 as an example, for two adjacent intermediate contact electrodes 12, such as two intermediate contact electrodes 12 labeled as 12-1 and 12-2 in FIG. 10, a line width of the electrode sub-portion 7 of the intermediate contact electrode 12-1 adjacent to the first outer edge 3 in the fourth sub-region 17 is greater than a line width of the electrode sub-portion 7 of the intermediate contact electrode 12-2 away from the first outer edge 3 in the third sub-region 16. For example, the line width of the electrode sub-portion 7 of the intermediate contact electrode 12-1 adjacent to the first outer edge 3 in the fourth sub-region 17 is 27 μm, while the line width of the electrode sub-portion 7 of the intermediate contact electrode 12-2 away from the first outer edge 3 in the third sub-region 16 is 19 μm.

It is to be noted that the third sub-region 16 may be the first sub-region 14 and the fourth sub-region 17 may be the second sub-region 15, or both the third sub-region 16 and the fourth sub-region 17 may be the second sub-region 15.

According to this structure, along the first direction x, while the line widths of the electrode sub-portions 7 of the intermediate contact electrode 12 are increased gradually, the line width of the electrode sub-portion 7 in the sub-region 6 with the decreased number of the electrode sub-portions 7 in two adjacent sub-portions 6 is further widened. This further increases a distribution area of an electrode pattern in the sub-region 6, and reduces a distribution difference between electrode patterns in different sub-regions 6.

Figure 11:
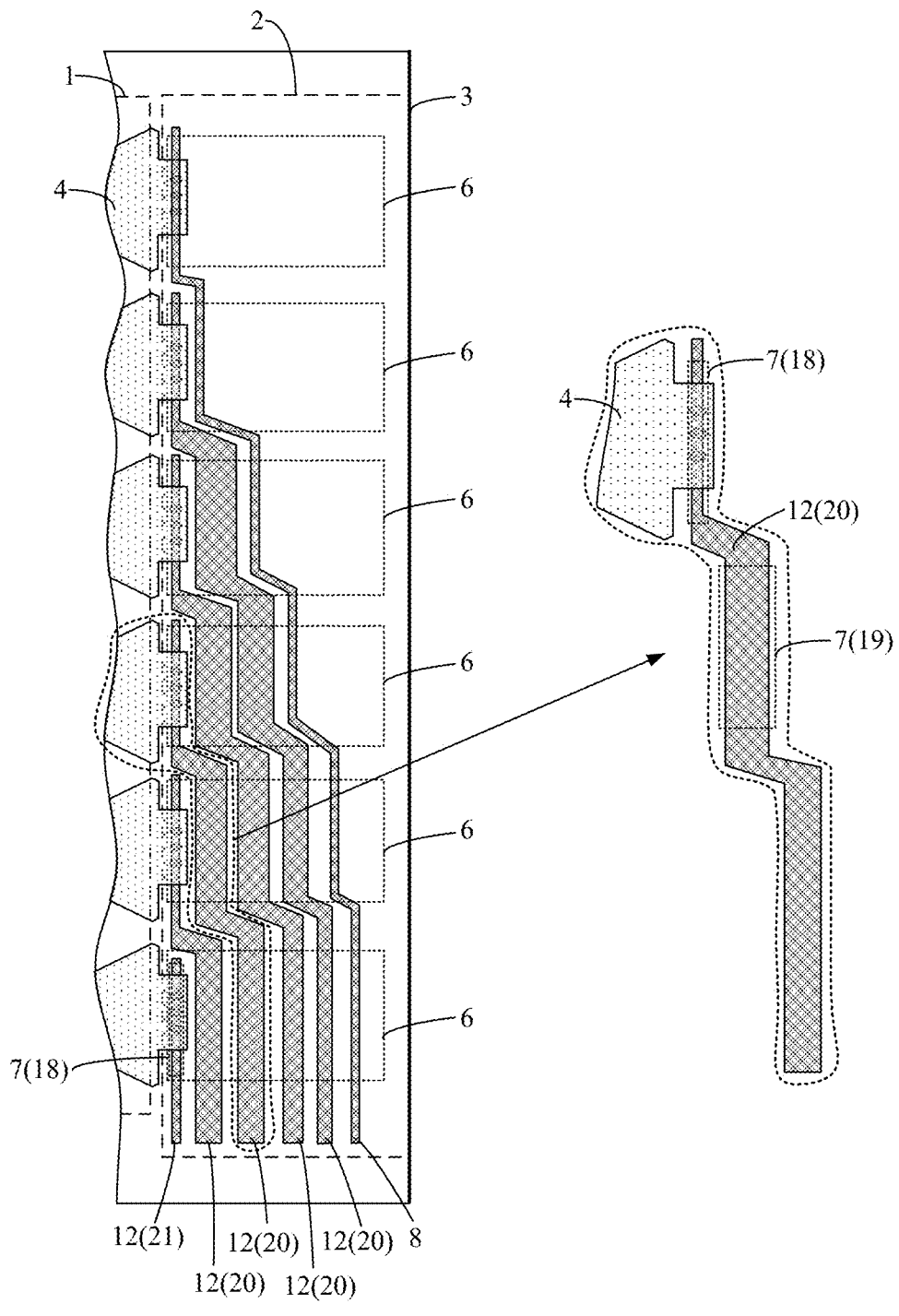
FIG. 11 is yet another schematic structural view of a contact electrode according to an embodiment of the present disclosure.

FIG. 11 is yet another schematic structural view of a contact electrode 5 according to an embodiment of the present disclosure. In a possible implementation, as shown in FIG. 11, the electrode sub-portion 7 of the contact electrode 5 includes a first electrode sub-portion 18. The first electrode sub-portion 18 is electrically connected to the first touch electrode 4. The electrode sub-portion 7 of at least one of the contact electrodes 5 further includes a second electrode sub-portion 19. The second electrode sub-portion 19 is adjacent to the first electrode sub-portion 18.

The contact electrodes 5 further include intermediate contact electrodes 12. The intermediate contact electrodes 12 are located between the display region 1 and the edge contact electrode 8. The intermediate contact electrodes 12 include a first-type intermediate contact electrode 20. A line width of the first electrode sub-portion 18 of the first-type intermediate contact electrode 20 is smaller than a line width of the second electrode sub-portion 19.

The first-type intermediate contact electrode 20 is narrowed when extending to a position where the first-type intermediate contact electrode is connected to the first touch electrode 4. This can increase a resistance of the first-type intermediate contact electrode 20 at the connecting via hole, to relieve the sudden change of the resistance at the connecting via hole between the first-type intermediate contact electrode 20 and the first touch electrode 4, and improve an anti-static electricity capacity of the first-type intermediate contact electrode 20.

In a possible implementation, in order to further relieve the sudden change of the resistance at the connecting via hole between the first-type intermediate contact electrode 20 and the first touch electrode 4, the line width of the first electrode sub-portion 18 of the first-type intermediate contact electrode 20 is the same as the minimum line width of the edge contact electrode 8. Exemplarily, the first electrode sub-portion 18 of the first-type intermediate contact electrode 20 has the line width of 3.7 μm.

Certainly, in other possible implementations of the present disclosure, the line width of the first electrode sub-portion 18 of the first-type intermediate contact electrode 20 may also be greater than the minimum line width of the edge contact electrode 8.

Further, referring also to FIG. 11, the intermediate contact electrodes 12 further include a second-type intermediate contact electrode 21. The electrode sub-portion 7 of the second-type intermediate contact electrode 21 only includes the first electrode sub-portion 18. A line width of the first electrode sub-portion 18 of the second-type intermediate contact electrode 21 may be the same as the minimum line width of the edge contact electrode 8, and may also be greater than the minimum line width of the edge contact electrode 8 but smaller than the line width of the electrode sub-portion 7 of the first-type intermediate contact electrode 20 in the sub-region 6.

Figure 12:
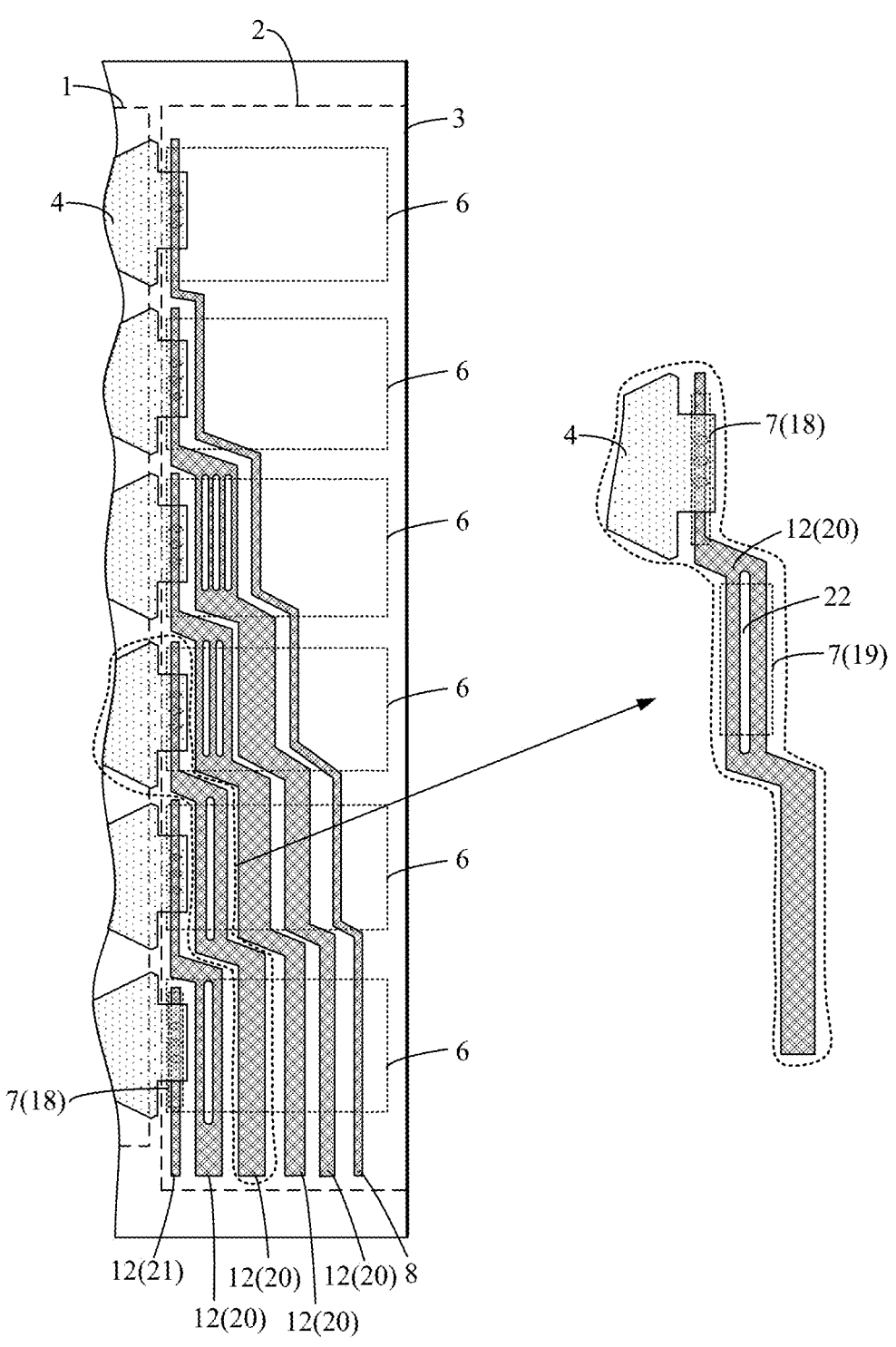
FIG. 12 is yet another schematic structural view of a contact electrode according to an embodiment of the present disclosure.

FIG. 12 is yet another schematic structural view of a contact electrode 5 according to an embodiment of the present disclosure. In a possible implementation, as shown in FIG. 12, the second electrode sub-portion 19 of the first-type intermediate contact electrode 20 includes a hollow 22. The hollow 22 may be a strip hollow 22.

The hollow 22 on the second electrode sub-portion 19 can increase a resistance of the second electrode sub-portion 19. The second electrode sub-portion 19 is also adjacent to the corresponding connecting via hole of the contact electrode 5. Increasing the resistance of the second electrode sub-portion 19 also can further relieve the sudden change of the resistance at the connecting via hole.

Figure 13:
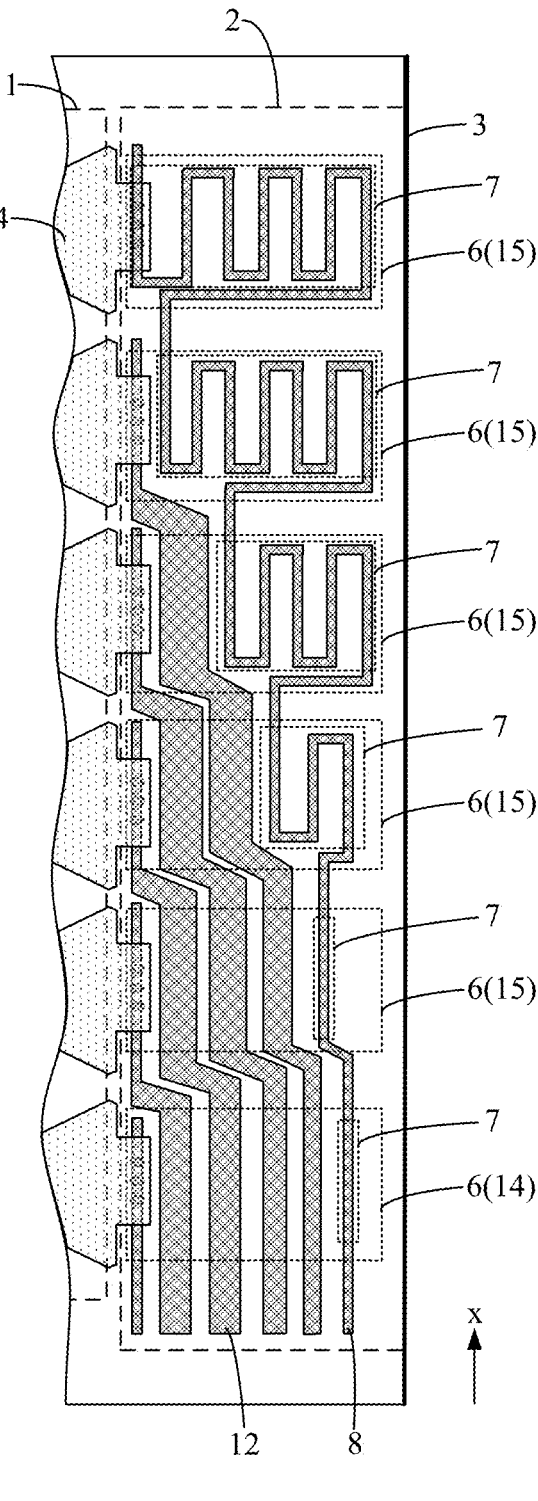
FIG. 13 is yet another schematic structural view of a contact electrode according to an embodiment of the present disclosure.

FIG. 13 is yet another schematic structural view of a contact electrode 5 according to an embodiment of the present disclosure. In a possible implementation, as shown in FIG. 13, the sub-regions 6 include a first sub-region 14 and at least one second sub-region 15. A number of the electrode sub-portions 7 in the first sub-region 14 is greater than a number of the electrode sub-portions 7 in the second sub-region 15. Exemplarily, the first sub-region 14 may be the sub-region 6 with a largest number of the electrode sub-portions 7, while the second sub-region 15 may be the other sub-region 6 except the first sub-region 14.

In at least one of the second sub-regions 15, the electrode sub-portion of the edge contact electrode 8 is wound circuitously. On one hand, this can weaken a distribution difference between an electrode pattern in the second sub-region 15 and an electrode pattern in the first sub-region 14, and makes etching and reflection more uniform. On the other hand, this can further increase the resistance of the edge contact electrode 8, and improve the anti-static electricity capacity of the edge contact electrode 8.

Figure 14:
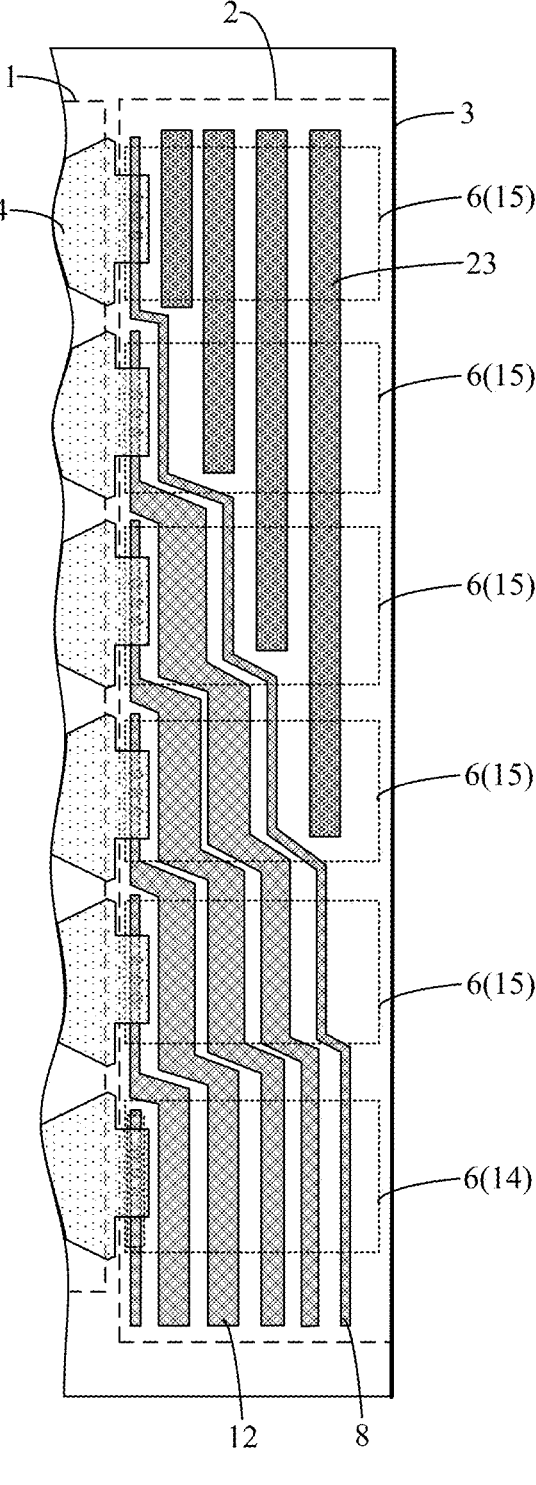
FIG. 14 is yet another schematic structural view of a contact electrode according to an embodiment of the present disclosure.

FIG. 14 is yet another schematic structural view of a contact electrode 5 according to an embodiment of the present disclosure. In a possible implementation, as shown in FIG. 14, the sub-regions 6 include a first sub-region 14 and at least one second sub-region 15. A number of the electrode sub-portions 7 in the first sub-region 14 is greater than a number of the electrode sub-portions 7 in the second sub-region 15. Exemplarily, the first sub-region 14 may be the sub-region 6 with a largest number of the electrode sub-portions 7, while the second sub-region 15 may be the other sub-region 6 except the first sub-region 14.

The touch display panel may further include a dummy electrode 23. The dummy electrode 23 is at least located in the second sub-region 15. With the dummy electrode 23, the electrode pattern in the second sub-region 15 and the electrode pattern in the first sub-region 14 are more uniform, thereby making the etching and reflection more uniform. The dummy electrode 23 may be floated, and may also be connected to a fixed potential.

Figure 15:
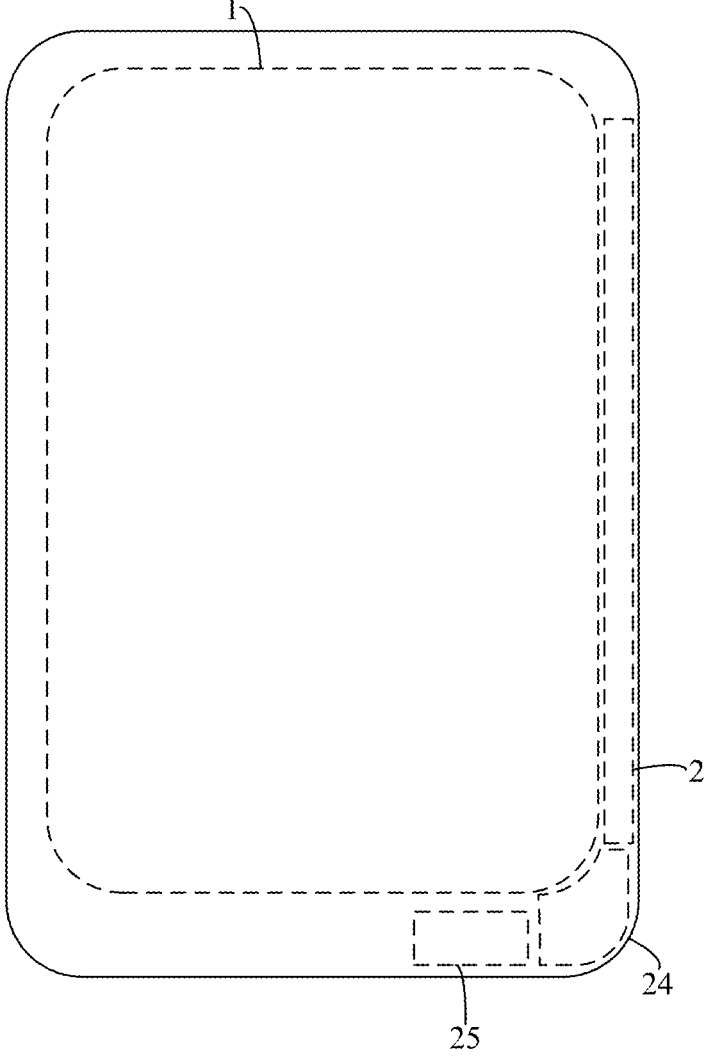
FIG. 15 is a schematic structural view showing region division of a touch display panel according to an embodiment of the present disclosure.
Figure 16:
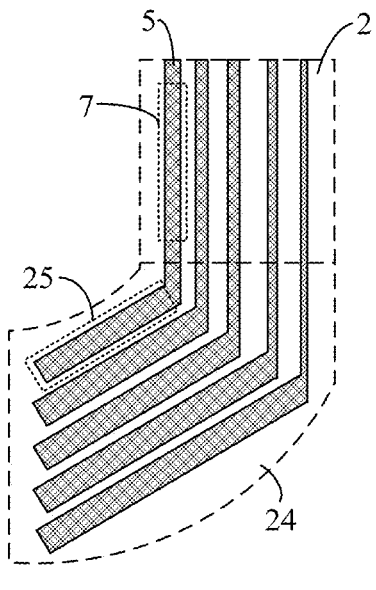
FIG. 16 is a partial schematic structural view of a touch display panel according to an embodiment of the present disclosure.

FIG. 15 is a schematic structural view showing region division of a touch display panel according to an embodiment of the present disclosure. FIG. 16 is a partial schematic structural view of a touch display panel according to an embodiment of the present disclosure. In a possible implementation, as shown in FIG. 15 and FIG. 16, the touch display panel further includes a first corner region 24. The first corner region 24 is connected to the first border region 2. The contact electrode 5 further includes a winding part 25 in the first corner region 24. In the contact electrode 5, a line width of the winding part 25 is greater than a maximum line width of the electrode sub-portion 7. Exemplarily, the line width of the winding part 25 in the contact electrode 5 is 43 μm.

Referring to FIG. 15, it is to be noted that the touch display panel further includes a binding region 26. The winding part 25 is electrically connected to the electrode sub-portion 7 and a pad (not shown in the figure) in the binding region 26.

Compared with the linearly extending first border region 2, the first corner region 24 has a larger border width. Therefore, the contact electrode 5 can have a larger line width in the first corner region 24. This reduces a current density on the winding part 25, and prevents breakdown of the winding part 25 for a current.

Figure 17:
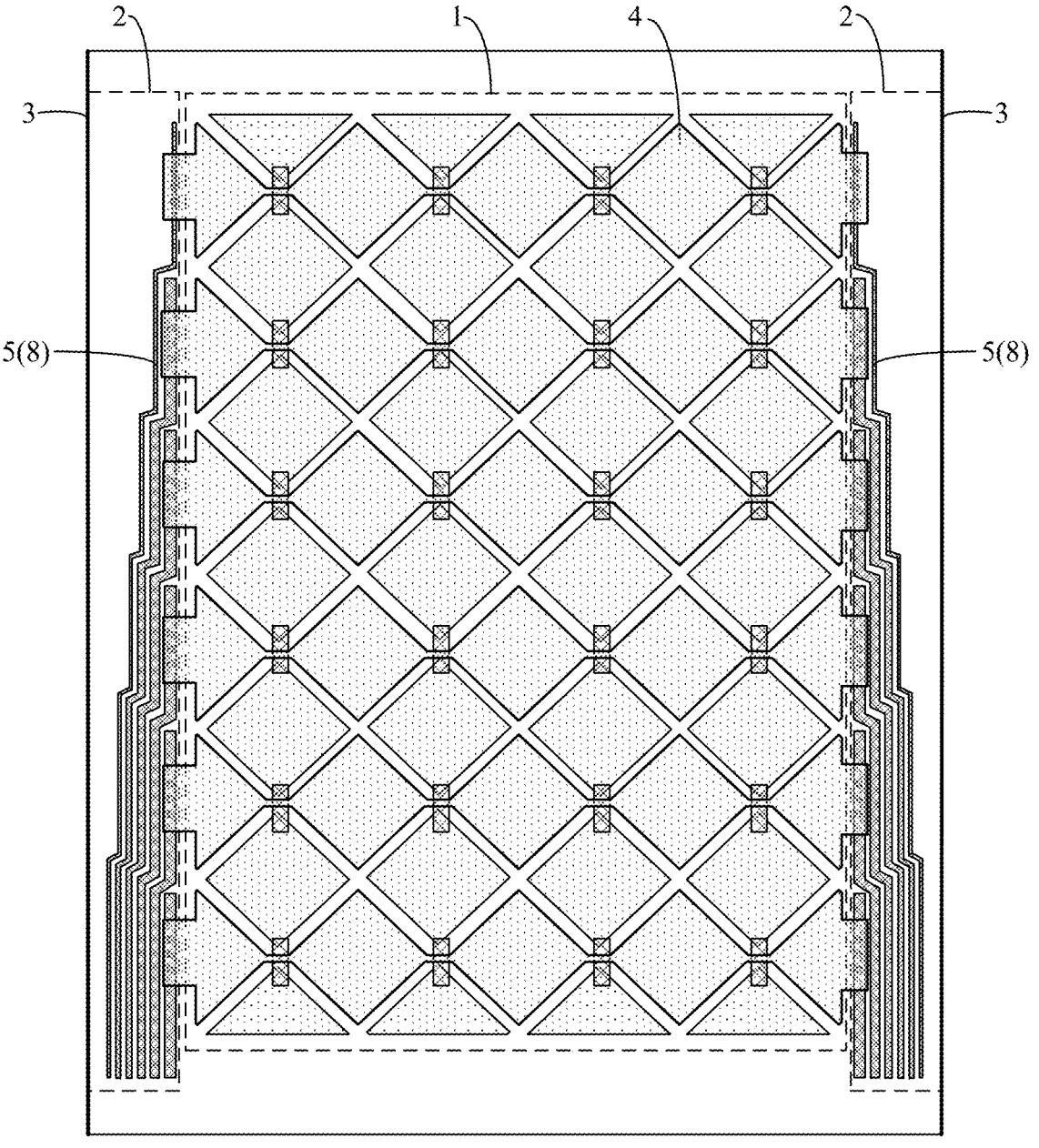
FIG. 17 is another schematic structural view of a touch display panel according to an embodiment of the present disclosure.

In addition, referring also to FIG. 2, it is further to be noted that the touch display panel may include one first border region 2 in the embodiment of the present disclosure. The first touch electrodes 4 may be only electrically connected to the contact electrodes 5 at one side. FIG. 17 is another schematic structural view of a touch display panel according to an embodiment of the present disclosure. Alternatively, as shown in FIG. 17, the touch display panel may also include two first border regions 2. The first touch electrodes 4 may be electrically connected to the contact electrodes 5 at two sides.

Figure 18:
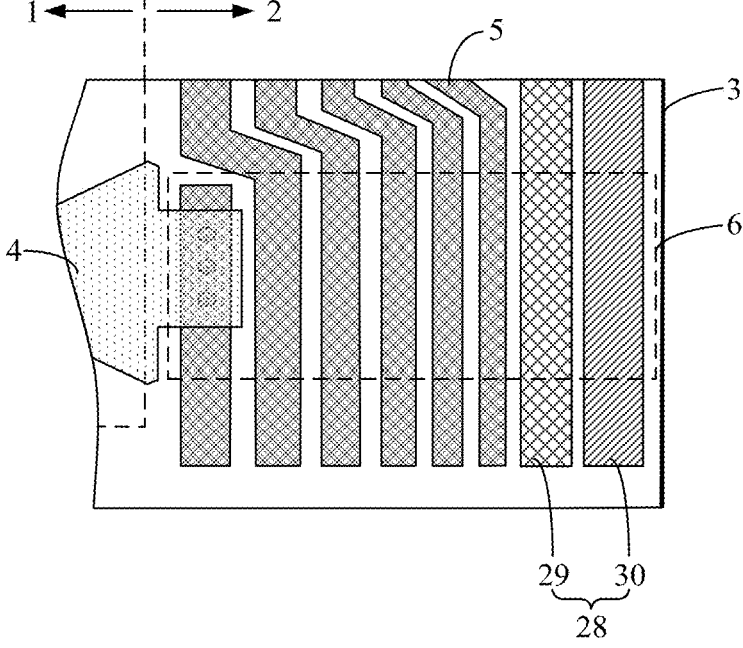
FIG. 18 is another partial schematic structural view of a touch display panel according to an embodiment of the present disclosure.

In addition, FIG. 18 is another partial schematic structural view of a touch display panel according to an embodiment of the present disclosure. As shown in FIG. 18, the touch display panel may further include an electrostatic protection trace 28. The electrostatic protection trace 28 is located between the contact electrode 5 and the first outer edge 3, and configured to take an electrostatic protection effect to reduce accumulation of electrostatic charges on the contact electrodes 5.

Further, the electrostatic protection trace 28 may include a first trace 29 and a second trace 30. The first trace 29 is a copper wire, while the second trace 30 receives a grounding voltage.

Figure 19:
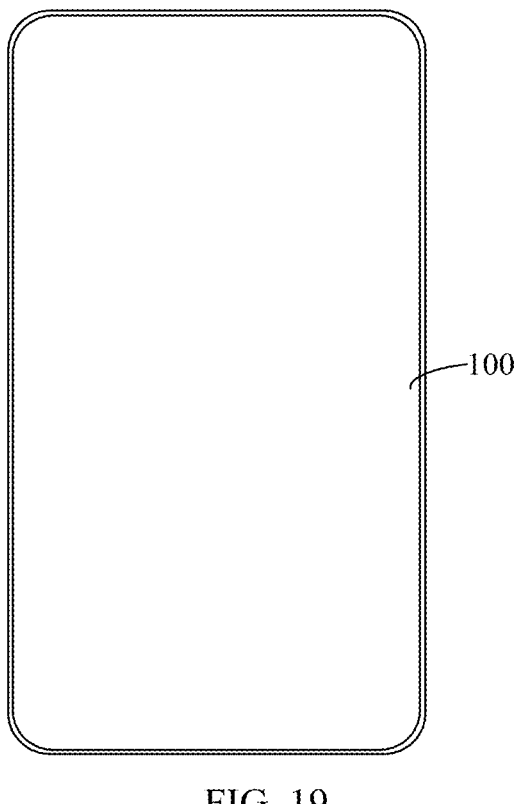
FIG. 19 is a schematic structural view of a touch control display apparatus according to an embodiment of the present disclosure.

Based on the same inventive concept, an embodiment of the present disclosure further provides a touch control display apparatus. FIG. 19 is a schematic structural view of a touch control display apparatus according to an embodiment of the present disclosure. As shown in FIG. 19, the touch control display apparatus includes the foregoing touch display panel 100. A specific structure of the touch display panel 100 has been described in detail in the foregoing embodiment. Details are not described herein again. Certainly, the touch control display apparatus shown in FIG. 19 is for schematic description only. The touch control display apparatus may be any electronic device with a display function, such as a mobile phone, a tablet computer, a notebook computer, an ebook, or a television.

The above descriptions are merely preferred embodiments of the present disclosure, and are not intended to limit the present disclosure. Any modifications, equivalent replacements, improvements, and the like made within the spirit and principle of the present disclosure shall fall within the protection scope of the present disclosure.

Finally, it should be noted that the above embodiments are merely intended to describe the technical solutions of the present disclosure, rather than to limit the present disclosure. Although the present disclosure is described in detail with reference to the above embodiments, persons of ordinary skill in the art should understand that they may still make modifications to the technical solutions described in the above embodiments or make equivalent replacements to some or all technical features thereof, without departing from the essence of the technical solutions in the embodiments of the present disclosure.

What is claimed is:

1. A touch display panel, comprising:
a display region and a first border region, wherein
the first border region comprises a first outer edge away from the display region;
first touch electrodes at least located in the display region; and
contact electrodes at least located in the first border region, and respectively electrically connected to the first touch electrodes,
wherein the first border region comprises sub-regions arranged in an extension direction of the first border region; numbers of the contact electrodes arranged in different sub-regions are different from one another;
one of the contact electrodes comprises at least one electrode sub-portion; and one of the at least one electrode sub-portion of the contact electrode is located in one of the sub-regions; and
the contact electrodes comprise an edge contact electrode adjacent to the first outer edge; and in at least one of the sub-regions, the electrode sub-portion of the edge contact electrode has a minimum line width in line widths of all of the electrode sub-portions in the sub-region;
wherein the sub-regions comprise a first sub-region and at least one second sub-region; and number of the electrode sub-portions in the first sub-region is greater than number of the electrode sub-portions in the second sub-region; and
a line width of the electrode sub-portion of the edge contact electrode in the second sub-region is smaller than a line width of the electrode sub-portion of the edge contact electrode in the first sub-region.

2. The touch display panel according to claim 1, wherein the line width of the electrode sub-portion of the edge contact electrode is greater than or equal to 3.7 μm and smaller than or equal to 10 μm.

3. The touch display panel according to claim 1, wherein the contact electrodes further comprise intermediate contact electrodes located between the display region and the edge contact electrode; and
in at least one of the sub-regions, the electrode sub-portions of at least two of the intermediate contact electrodes have a same line width, and/or,
in at least one of the sub-regions, the electrode sub-portions of at least two of the intermediate contact electrodes have different line widths.

4. The touch display panel according to claim 1, wherein for at least one of the sub-regions, along a direction from the display region to the first outer edge, line widths of the electrode sub-portions in the at least one sub-region are decreased gradually.

5. The touch display panel according to claim 1, wherein for at least one of the sub-regions, the electrode sub-portions in the sub-region are configured to form at least two electrode sets; the electrode sub-portions in a same electrode set of the at least two electrode sets have a same line width; and
along a direction from the display region to the first outer edge, line widths of the electrode sub-portions in the at least two electrode sets are decreased gradually.

6. The touch display panel according to claim 1, wherein the contact electrodes further comprise intermediate contact electrodes; and the intermediate contact electrodes are located between the display region and the edge contact electrode; and
for at least one of the sub-regions, the electrode sub-portions of at least two of the intermediate contact electrodes in the sub-region have a same line width.

7. The touch display panel according to claim 1, wherein the first sub-region comprises a largest number of the electrode sub-portions in the sub-regions.

8. The touch display panel according to claim 1, wherein along a first direction, numbers of the electrode sub-portions in the plurality of sub-regions are decreased gradually, and line widths of the electrode sub-portions of the edge contact electrode are decreased gradually.

9. The touch display panel according to claim 1, wherein along a first direction, numbers of the electrode sub-portions in the plurality of sub-regions are decreased gradually; and
the contact electrodes further comprise intermediate contact electrodes; the intermediate contact electrodes are located between the display region and the edge contact electrode; and
along the first direction, line widths of the electrode sub-portions of at least one of the intermediate contact electrodes are increased gradually.

10. The touch display panel according to claim 9, wherein two adjacent ones of the sub-regions comprise a third sub-region and a fourth sub-region; and a number of the electrode sub-portions in the third sub-region is greater than a number of the electrode sub-portions in the fourth sub-region; and
for two adjacent ones of the intermediate contact electrodes, a line width of the electrode sub-portion of the intermediate contact electrode adjacent to the first outer edge in the fourth sub-region is greater than a line width of the electrode sub-portion of the intermediate contact electrode away from the first outer edge in the third sub-region.

11. The touch display panel according to claim 1, wherein the electrode sub-portions of the contact electrode comprise a first electrode sub-portion; the first electrode sub-portion is electrically connected to the first touch electrode; the electrode sub-portions of at least one of the contact electrodes further comprise a second electrode sub-portion adjacent to the first electrode sub-portion; and the contact electrodes further comprise intermediate contact electrodes; the intermediate contact electrodes are located between the display region and the edge contact electrode; the intermediate contact electrodes comprise a first-type intermediate contact electrode; and a line width of the first electrode sub-portion of the first-type intermediate contact electrode is smaller than a line width of the second electrode sub-portion of the first-type intermediate contact electrode.

12. The touch display panel according to claim 11, wherein the line width of the first electrode sub-portion of the first-type intermediate contact electrode is equal to a minimum line width of the edge contact electrode.

13. The touch display panel according to claim 11, wherein the second electrode sub-portion of the first-type intermediate contact electrode comprises a hollowed portion.

14. The touch display panel according to claim 1, wherein the sub-regions comprise a first sub-region and at least one second sub-region; and a number of the electrode sub-portions in the first sub-region is greater than a number of the electrode sub-portions in the second sub-region; and in at least part of the second sub-region, the electrode sub-portion of the edge contact electrode is wound circuitously.

15. The touch display panel according to claim 1, wherein the sub-regions comprise a first sub-region and at least one second sub-region; and a number of the electrode sub-portions in the first sub-region is greater than a number of the electrode sub-portions in the second sub-region; and the touch display panel further comprises a dummy electrode; and the dummy electrode is at least located in the second sub-region.

16. The touch display panel according to claim 1, further comprising a first corner region, and the first corner region is connected to the first border region; and the contact electrode further comprises a winding part in the first corner region, and in the contact electrode, a line width of the winding part is greater than a maximum line width of the electrode sub-portion.

17. A touch control display apparatus, comprising a touch display panel, wherein, the touch display panel, comprises:

a display region and a first border region, wherein the first border region comprises a first outer edge away from the display region;

first touch electrodes at least located in the display region; and contact electrodes at least located in the first border region, and respectively electrically connected to the first touch electrodes, wherein the first border region comprises sub-regions arranged in an extension direction of the first border region; numbers of the contact electrodes arranged in different sub-regions are different from one another;

one of the contact electrodes comprises at least one electrode sub-portion; and one of the at least one electrode sub-portion of the contact electrode is located in one of the sub-regions; and the contact electrodes comprise an edge contact electrode adjacent to the first outer edge; and in at least one of the sub-regions, the electrode sub-portion of the edge contact electrode has a minimum line width in line widths of all of the electrode sub-portions in the sub-region;

wherein the sub-regions comprise a first sub-region and at least one second sub-region; and number of the electrode sub-portions in the first sub-region is greater than number of the electrode sub-portions in the second sub-region; and a line width of the electrode sub-portion of the edge contact electrode in the second sub-region is smaller than a line width of the electrode sub-portion of the edge contact electrode in the first sub-region.

* * * * *